June 20, 1944.  E. J. GENGLER  2,351,675
MILKING TIMER
Filed Oct. 5, 1942  2 Sheets-Sheet 1
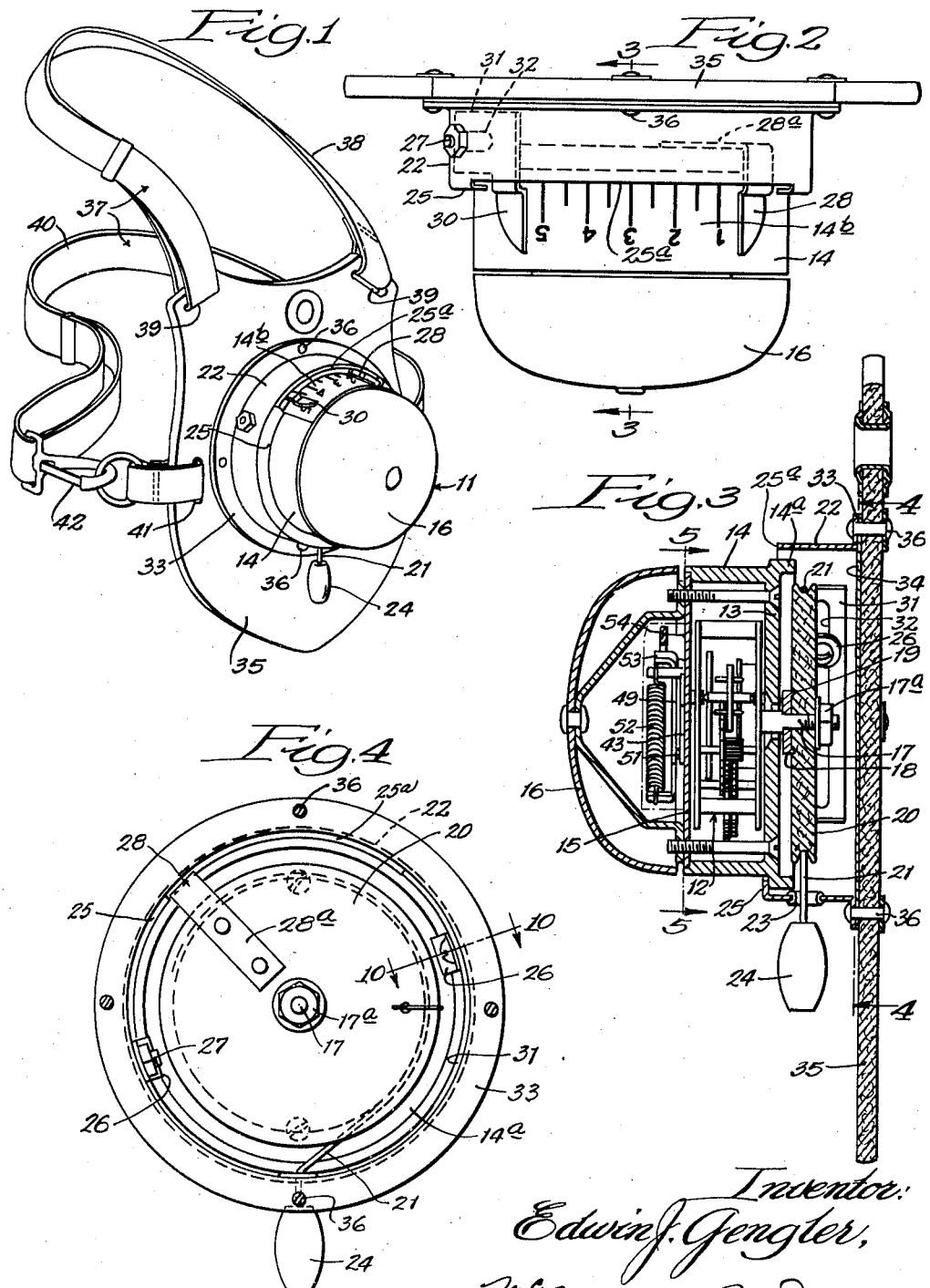
Inventor:
Edwin J. Gengler,
By McCaleb, Nends and Dickinson,
Attorneys.

June 20, 1944.  E. J. GENGLER  2,351,675
MILKING TIMER
Filed Oct. 5, 1942  2 Sheets-Sheet 2
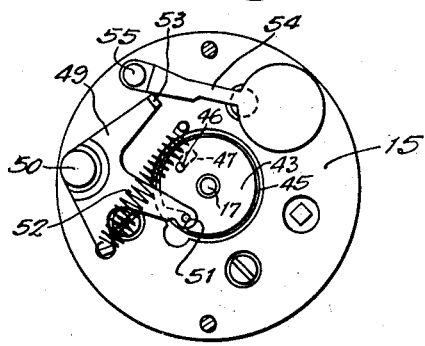
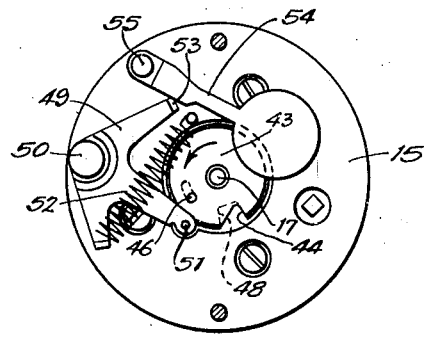
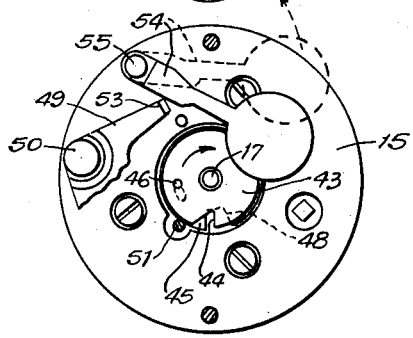
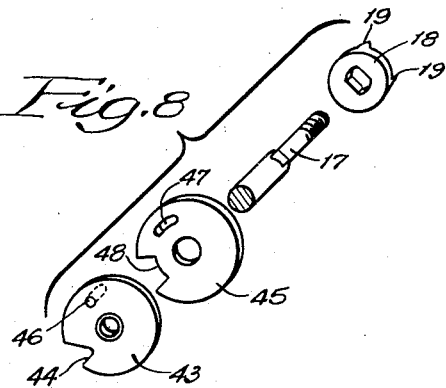
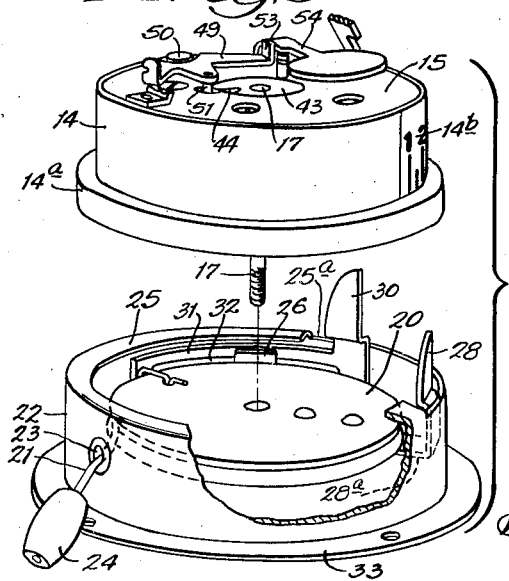
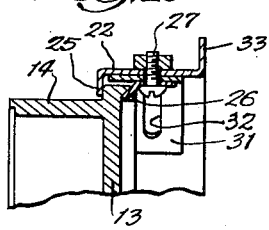
Inventor:
Edwin J. Gengler,
By McCabe, Neud[?]augh[?] Dickinson
Attorneys.

Patented June 20, 1944

2,351,675

UNITED STATES PATENT OFFICE 2,351,675

MILKING TIMER

Edwin J. Gengler, Milwaukee, Wis., assignor to
Paul J. Coleman, Highland Park, Ill.

Application October 5, 1942, Serial No. 460,890

5 Claims. (Cl. 161—23)

My invention relates to milking timers and more specifically to an alarm type timer to be carried on the person of the dairyman attending a milking machine to remind him of the expiration of a predetermined period of time of operation of a milking machine upon the cow or cows to which it is attached.

Both under-milking and over-milking of a cow by a milking machine is detrimental to a cow and her milk production. It has been found that if the successive periods of operation of a milking machine upon a given cow be kept constant, at a period of time approximating the required milking period, the cow will soon adapt herself to let down her milk at such a rate that the milk will be just exhausted when the constant period ends. It has further been found that this period of time need not be different for each individual cow, but that in general all cows of a given breed and strain can readily be brought into adjustment to the same fixed milking period.

For these reasons it becomes of great concern to dairymen employing milking machines that the period of time during which a milking machine operates upon each cow be kept constant from day to day.

It has been proposed to incorporate automatic timers in the milking machine which will cause it to cease milking a cow after a predetermined time. But because of the varying construction of different makes of milking machines, such timing devices do not readily lend themselves to merchandising as a standard article to dairymen generally.

The use of an entirely separate and independent alarm timer in the nature of an alarm clock, not being well adapted to carry on the person of the attendant, would involve the objection that it would have to be left in some location such as a shelf or hook in the barn and might not be heard by the attendant if he made good use of his time by attending to other chores which might take him some distance. Also, in larger dairy barns where there are a number of attendants each in charge of one or two milking machines, there would have to be a number of such alarm clocks stationed adjacent each of several groups of stanchions and there would be considerable confusion as between the different attendants—unless they remained at their respective stanchions during the milking periods—in determining which alarm was intended for which attendant.

With the foregoing background in mind, the chief object of my invention is to provide a timing device with an alarm feature so constructed and arranged that it may readily be carried on the person of the attendant whereby, regardless of where he happens to be, he will hear the alarm and there will be no confusion as to whether the alarm he hears concerns himself or some fellow attendant.

However, my invention embraces much more than merely providing for attaching an alarm timer to the person of an attendant. Its additional features include: a harness whereby the device may readily be attached to or detached from the attendant; the absence of any loose parts; the holding of the device in a fixed position upon the body of the attendant where it is restrained from swinging where it might handicap the work of the attendant or be damaged, and in a position where the timer is well guarded from external injury and readily inspected by the attendant, and even in such a position that the attendant may put on an overcoat or jacket without removing the device and still be able to inspect and operate it; a setting device which the attendant may readily grasp without having to remove any clumsy mittens which he may be wearing; the placing of the dial and indicators in an unusual position in reference to the timer whereby they may readily be inspected by the attendant; a conveniently accessible position for the manually engageable setting mechanism; and the positioning of the alarm bell where it is least apt to be muffled or deadened by the attendant's clothing.

The foregoing, together with further objects, features and advantages of my invention, are set forth in the following description of a specific embodiment thereof which is illustrated in the accompanying drawings wherein:

Fig. 1 is a perspective view of the device in its entirety;

Fig. 2 is a plan view thereof from the front;

Fig. 3 is an axial vertical section taken on the line 3—3 of Fig. 2;

Fig. 4 is a vertical transverse section taken on the line 4—4 of Fig. 3;

Figs. 5, 6 and 7 are vertical transverse sections taken on the line 5—5 of Fig. 3, showing the bell-striking mechanism in its several positions;

Fig. 8 is an exploded perspective view of the central shaft and cams of the timing mechanism;

Fig. 9 is a partly disassembled view of the timing and bell-striking mechanisms; and Fig. 10 is a detail radial section taken on the line 10—10 of Fig. 4.

The timer indicated generally as 11 comprises a suitable standard clock mechanism 12—spring and escapement mechanism—enclosed in a short cylindrical housing formed by a cup-shaped member having a back plate 13, a cylindrical barrel portion 14, and a front cover plate 15, and a bowl-shaped bell 16 centrally mounted upon, and forwardly of, the housing with its peripheral edges flush with the barrel 14 to preserve a neat conformation relative thereto. A bell-striking mechanism is positioned forwardly of the plate 15 and within the bell 16. A shaft 17 protrudes rearwardly from the back plate 13 of the housing.

The mechanism as thus far described, including the clock mechanism, the housing, the bell, the bell-striking mechanism, and the shaft, as here shown, is of a known and standard design and therefore will not be specifically described except to clarify the functioning of the striking mechanism. I might here explain, however, that the rotation of the shaft 17 in one direction through a predetermined number of degrees will wind the clock mechanism spring to cause the shaft, under the control of the escapement mechanism, to rotate in the opposite direction through a corresponding predetermined period of time at the end of which the striking mechanism sounds the alarm bell.

Heretofore the dial and hands employed with such a timing and alarm unit have been disposed at the back of the unit and in a plane at a normal to the axis of the unit. While that is well adapted to the purposes of an alarm timer to be mounted after the fashion of an alarm clock for ready inspection of the dial and hands, it would present serious problems were it to be mounted on the body of an attendant if the dial and hands were to be readily inspected by him. If the dial end were placed toward his body, he could not see it; if it were placed away from his body, he would have to bend his head forward in an awkward manner to view it. If it were mounted in a shifted position with its axis vertical, its dial at the top and the bell at the bottom, the mounting would have to be effected by some spider-like frame arrangement and the device would have to protrude an inconvenient distance forward of the body of the attendant in order to keep the bell well away from the muffling effect of contact with the attendant's clothing and in general the hands would be vulnerably exposed.

One of the features of my invention is that I preserve the most desirable position of the bell and mechanism housing in reference to the attendant's body, that is, with the axis of the unit horizontal and outstanding from the body with the bell forward and hence remote from the body and its clothing. Yet I preserve the optimum visibility to the attendant of the dial and hands by placing them on the top crown of the housing and attain the most convenient manual engagement of the setting mechanism by giving it the form of a cord or cable depending from the bottom of the unit and terminating in a sizeable ball for ready manipulation even though the attendant be wearing mittens.

I prefer, in carrying out my invention, to add to this standard unit, certain adjustable setting mechanisms, housings, and mountings which I shall now describe.

A washer 18 having a flatted hole therethrough is seated upon a corresponding flatted portion of the shaft 17 and carries rearwardly facing marginal pointed projections 19 whereby non- rotatably to engage the forward face of a pulley 20 also mounted upon the shaft 17 and retained thereon by a nut 17a. One end of a pull cord 21 is anchored to the pulley and the adjoining reach of the cord is trained about the pulley to pass through an eyeletted hole 23 in the bottom arc of a mounting shell 22 and terminating in a ball or knob 24.

The mounting shell 22 is a short drum of a diameter loosely to embrace the rear peripheral bead 14a of the housing barrel 14. At its forward edge the drum 22 has a narrow inturned flange 25 which overlies the front face of the bead 14a. The flange 25 is held against the bead 14a, and the housing 13, 14 is mounted upon the shell 22, with the aid of clips 26 secured by clip bolts 27 passing through holes in the shell 22 at diametrically opposed points.

A pulley-carried hand 28 of generally L-shaped form is mounted on the pulley 20 by the inwardly turned leg 28a of the hand which is riveted to the back side of the pulley as shown in Fig. 4. The hand 28 extends horizontally forwardly between the shell 22 and the housing barrel 14, there being a slight inward offset in the hand 28 to pass over the bead 14a so that the exposed portion of the hand 28 lies closely adjacent the periphery of the barrel 14.

As shown in Figs. 4 and 9, the inturned flange 25 of the shell 22 is interrupted as shown at 25a through an arc of about ninety degrees. This interruption of the flange 25 permits the pulley-carried hand 28 to extend outwardly forwardly from the clearance space between the shell 22 and the housing bead 14a.

From this it will be seen that when the pendant ball 24 at the end of the cord 21 is pulled, the pulley will be rotated and the pulley-carried hand 28 will move arcuately over the periphery of the barrel 14.

A complementary but fixed hand 30 is also mounted to lie closely adjacent the periphery of the barrel 14. While it is fixed, it is adjustable arcuately of the barrel 14. Its adjustable mounting is effected by an arcuately curved extension 31 conformed to fit against the inner face of the shell 22 and provided with an elongated slot 32 penetrated by one of the clip bolts 27. As shown in Fig. 10, the arcuate extension 31 of the fixed hand 30 is clamped between the clip 26 and the shell 22 by means of the clip bolt 27. By loosening the bolt, the fixed hand 30 may be shifted and reclamped at any desired position arcuately of the drum periphery 14 within the limits of the length of the slot 32 and the arcuate interruption 25a of the inturned flange of the shell.

At its rearward edge, the shell 22 carries an outturned flange 33 whereby it is riveted at diametrically opposed points to a back closure disc 34. The shell 22, and thereby the parts which it supports, along with the back closure plate 34 (which is preferable but optional) is in turn fixed to a mounting plate 35 by means of other rivets 36 which pass through the flange 33, the closure plate 34, and the mounting plate 35.

The mounting plate 35 is of considerably greater height and width than the shell 22 and the parts which it in turn supports. This greater height and width is not only to afford convenient attachment for the harness, but to provide a broader vertical base for resting against the body of the attendant whereby to keep the timer from rocking sidewise or up and down in reference to the body.

While the mounting plate 35 may be made of a material which is quite stiff and rigid, such as metal, I prefer to use a rather resiliently flexible material such as light sole leather. With the mounting plate strapped against his body by the carrying harness, there is a possibility that in bending his body, especially in making some unusual movement, a rigid mounting plate pushed tightly against his body might injure the attendant, whereas the sole leather would flex in such a situation, saving him injury.

The harness 37 comprises a neck strap 38 secured at its ends, with provision for adjustment, to slots 39 in the upper corners of the mounting plate 35, and a chest strap 40, also of adjustable length, secured at its ends in slots 41 in the mounting plate 35 disposed laterally of the axis of the timing unit. The chest strap 40 includes a snap hook 42 by which it may be opened up and reconnected to permit the chest strap to be passed around the attendant's back.

Thus, by the neck strap 38 which the attendant slips over his head and the chest strap which he applies around the back, the mounting plate 35 is mounted flatwise against his chest and the harness keeps it in that position.

The operation of my milking timer is as follows:

The attendant connects a milking machine to one or more cows (or, sometimes a plurality of milking machines to a few cows. Simultaneously with the starting of the machine milking of the cows, he pulls the cord knob 24 downwardly, which rotates the pulley wheel 20 and hence the shaft 17 until the pulley-carried hand 28 has rotated arcuately over the minute scale 14b (which is preferably etched, stamped, or painted directly upon the periphery of the barrel 14) until the hand registers on the scale the desired time interval for the milking machine operation.

This rotation of the shaft 17 through a predetermined number of degrees, correspondingly winds the spring of the clock mechanism 12 which, upon release of tension on the cord 21, proceeds to unwind and rotate the shaft 17 in the reverse direction under the control of the escapement of the clock mechanism.

Referring to Figs. 5 to 9, at its forward end, and within the central opening of the front plate 15 of the clock mechanism housing, the shaft 17 fixedly carries a disc 43 having a peripheral notch 44. Immediately behind the disc 43, but rotatable upon the shaft 17, is a second disc 45 having a lost motion connection with the disc 43 afforded by a pin 46 carried by the disc 43 and extending into an arcuate slot 47 in the disc 45.

The disc 45 has a peripheral arcuate notch 48 both the ends of which are radial, whereas one end of the notch 44 in the disc 43 is radial and the other oblique.

A bell crank 49 is pivoted at 50 on the forward side of the front plate 15 of the clock mechanism housing, and one end of it carries a pin 51 adapted to enter the notches 44 and 48 of the discs 43 and 45 under the urging of a spring 52. When the shaft 17 is rotated from its normal position by the cord 21 in the counterclockwise direction as viewed in Fig. 6, the rotation of the shaft-borne disc 43 causes the pin 51 to ride radially outwardly under the cam action of the oblique side of the notch 44 and thereafter to ride upon the periphery of the disc 45, which has a slightly larger diameter than the disc 43.

During the return rotation of the shaft 17 in the clockwise direction as viewed in Fig. 7 under the power of the clock mechanism, the pin 51 frictionally holds the disc 45 until its shoulder overlaps the oblique side of the notch 44, as shown in Fig. 7. Thereafter the disc 45 is moved in the clockwise direction with the disc 43 until the aligned portions of the notches 44 and 45 provided by the pin 46 and slot 47 come into register with the pin 51, whereupon the pin 51 abruptly drops into the aligned notches under the influence of the spring 52, the bell crank 49 being abruptly swung in the counter-clockwise direction as viewed in Fig. 7.

This abrupt swinging of the bell crank 49 causes its other arm 53 to engage the bell striking arm 54, which is pivoted at 55 to the front plate 15 of the housing, throwing the enlarged or weighted end of the striker arm against the bell to sound an alarm.

Whether the attendant has stayed near the milking machines, or has had occasion meanwhile to occupy himself at some distance from the milking machines, the alarm is sure to be heard by him because it is carried with him. Upon hearing the alarm, he returns to the milking machines and terminates their operations.

When, as is a preferred practice, all of the cows in a group are trained to the same fixed milking period, as mentioned in the introduction, so that each setting of the clock mechanism will be for the same period of time, it becomes more convenient to have an automatic stop for the winding or setting movement of the clock mechanism, so that the attendant does not have to watch the travel of the pulley-carried hand 28 over the dial 14b. To accomplish this, the bolt which secures the arcuate extension 31 of the fixed hand 30 is loosened slightly, and the hand slipped arcuately of the mounting shell 22 until the fixed hand 30 indicates the desired setting period on the scale 14b, whereupon the bolt is again tightened. The fixed hand 30 thereupon becomes a fixed stop which is engaged by the hand 28 when the pull on the cord knob 24 has rotated the shaft the required number of degrees for the desired time interval.

Should an attendant with this milking timer strapped to his body have occasion to put on an overcoat, it is not necessary to remove the timer and readjust the harness to fit it over the overcoat. Instead, the overcoat may be put on over the harness. The unit as it protrudes from the mounting plate 35 coming in the center of his chest and rather high up, the overcoat may be left with one button unfastened or with the neck slightly open so that the attendant can still conveniently view the dial and observe the position of the moving hand 28 thereon. The depending pull knob 24 is of substantial size and conveniently located at the bottom and well forwardly where the attendant, even with heavy winter mittens, can readily engage it to set the timer.

The ready visibility of the dial is of special importance, for the attendant, without tilting the device or otherwise having to engage it with his mittened hands, can, by merely glancing downwardly, readily check on the time interval for which the fixed or stop hand 30 is set, and how much time has yet to elapse before the alarm will sound. The latter enables the attendant to plan the work or chores which he does during the timing interval so that he will get back to the milking machines about the time the alarm will sound.

The placement of the bell in a forward position on a horizontal axis, so that it outstands from the attendant's chest, has several advantages. One is that it presents a rounded surface which is not likely to injure or to become entangled with anything against which it may come in contact. Also, the forward position of the bell minimizes danger of the bell being muffled by contact with the attendant's outer clothing. The position of the dial, in spite of its being presented for ready inspection by the attendant, is in a shielded position where it is not apt to be engaged by anything which could catch the hands. Also, the depending cord and knob are in a well protected position where they are not apt to be accidentally engaged by something which would pull them out or otherwise impair the accuracy of the timing period.

Another advantage of my timer is that it is so designed that, while it incorporates all of these beneficial features, the clock mechanism, the housing therefor, the bell, and the bell-striking mechanism, is all a unit of a standard design available on the market, so that the manufacture of my milking timer does not require the manufacture of a specially designed unit.

While I have described and illustrated the specific embodiment of my invention, I contemplate that many changes or substitutions may be made without departing from the scope and spirit of my invention.

I claim:

1. As a milking timer, the combination with a timing-and-alarm unit comprising a cylindrical housing and a bell forming a rounded nose for one end thereof, and containing a clock mechanism, having a winding and timed shaft protruding from the other end of the housing, and a striking mechanism for the bell controlled by the timing mechanism—of means for mounting the unit to be worn on the person of a dairyman, for setting the unit and for dial indication of its timing movement, said means comprising a vertical mounting plate of considerably greater dimension than the diameter of the housing, a harness including neck and body straps for holding the mounting plate against the chest, a mounting shell fixed on the front face of the plate and in turn mounting the housing in horizontal outstanding position spaced from the plate with the bell foremost, a pulley fixed on the protruding end of the shaft between the housing and plate and within the shell, a pull cord trained about the pulley and passing out beneath the shell and terminating in a hand knob which upon being pulled will rotate the shaft to set the clock mechanism, a dial on the upper crown of the housing, and a shaft-carried hand passing out between the shell and housing in index relation to the dial.

2. The milking timer of claim 1 in which the outer margin of the shell is telescoped over the inner margin of the housing and has a radially inwardly extending flange with an arcuate interruption through which the shaft-carried hand extends.

3. A device to be associated with, and to mount, a timing-and-alarm unit of the type comprising a cylindrical housing and bell mounted at one end to form a rounded nose therefor and containing a clock mechanism and bell striking mechanism controlled by the clock mechanism—the device comprising a relatively large mounting plate, a harness to hold the plate vertically against a dairyman's chest, a mounting shell fixed on the plate and extending outwardly therefrom to be telescoped over the end of the housing remote from the bell, a pulley within the shell to be fixed to the winding and timed shaft of the clock mechanism, a cord trained about the pulley and passing through the bottom crown of the shell and terminating in a knob whereby to set the clock mechanism, and a hand carried by the pulley to extend out between the telescoped shell and housing to work over, and in index relation to, an upwardly exposed arcuate dial.

4. A milk timer comprising a chest plate, harness for holding the plate vertically against a dairyman's chest, a cylindrical shell mounted on the plate, a cylindrical enclosed housing mounted on the outer end of the shell, a dome-shaped bell mounted on said housing, said shell, housing and bell being located in horizontal alignment, the edge of said bell being located close to the housing whereby the shell, housing and bell constitute a structure having a substantially continuous outline, clock mechanism within the housing, a rotatable member connected to said clock mechanism located within said shell, bell ringing mechanism connected to said clock mechanism and located within said bell on the outer side of said housing, and a cord connected to said rotatable member and extending from said shell whereby the clock mechanism may be wound up.

5. A milk timer comprising a chest plate, harness for holding the plate vertically against a dairyman's chest, a cylindrical shell mounted on the plate, a cylindrical enclosed housing mounted on the outer end of the shell, a dome-shaped bell mounted on said housing, said shell, housing and bell being located in horizontal alignment, the edge of said bell being located close to the housing whereby the shell, housing and bell constitute a structure having a substantially continuous outline, clock mechanism within the housing, a rotatable member connected to said clock mechanism located within said shell, said housing being provided on its upper side with time-indicating indicia, said shell being provided with a peripheral opening adjacent to said indicia, a time indicating hand mounted on said rotatable member and projecting through said opening to cooperate with said indicia, a stationary contact member adjustably mounted on said shell and having a portion adapted to cooperate with said indicia in alignment with said hand, bell ringing mechanism connected to said clock mechanism and located within said bell on the outer side of said housing, and a cord connected to said rotatable member and extending from said shell whereby the clock mechanism may be wound up.

EDWIN J. GENGLER.